United States Patent [19]

Takeuchi

[11] Patent Number: 5,510,434
[45] Date of Patent: Apr. 23, 1996

[54] CATALYST FOR PRODUCING AROMATIC VINYL COMPOUND POLYMER AND PROCESS FOR PRODUCING AROMATIC VINYL COMPOUND POLYMER BY USING SAME

[75] Inventor: Mizutomo Takeuchi, Ichihara, Japan

[73] Assignee: Idemitsu Kosan Co., Ltd., Tokyo, Japan

[21] Appl. No.: 347,241

[22] Filed: Nov. 23, 1994

[30] Foreign Application Priority Data

Nov. 26, 1993 [JP] Japan .................. 5-296186

[51] Int. Cl.$^6$ ................... C08F 4/643; C08F 12/08
[52] U.S. Cl. .............. 526/152; 526/113; 526/114; 526/115; 526/132; 526/133; 526/134; 526/148; 526/151; 526/153; 526/161; 526/162; 526/163; 526/164; 502/114; 502/115; 502/118; 502/121; 502/123; 502/129; 502/132; 502/133; 502/134
[58] Field of Search ................... 526/113, 114, 526/132, 133, 134, 152, 115, 151, 161, 162, 163, 164, 148, 153; 502/114, 115, 118, 121, 123, 129, 132, 133, 134

[56] References Cited

U.S. PATENT DOCUMENTS

| | | | |
|---|---|---|---|
| 3,334,079 | 8/1967 | Raich | 526/152 |
| 4,871,704 | 10/1989 | Kohara et al. | 526/152 X |
| 5,200,537 | 4/1993 | Lee et al. | |
| 5,391,660 | 2/1995 | Numao et al. | 526/152 X |

FOREIGN PATENT DOCUMENTS 4300813  7/1993  Germany .

OTHER PUBLICATIONS

Database WPI, Derwent Publications, AN–70–17293R, US–P–419 080, Mar. 26, 1954.
Patent Abstracts of Japan, vol. 11, No. 262, (C–442), Aug. 25, 1987, JP–A–62–061991, Mar. 18, 1987.
Macromolecules, vol. 21, No. 12, pp. 3356–3360, 1988, N. Ishihara, et al., "Stereospecific Polymerization of Styrene Giving the Syndiotactic Polymer".

*Primary Examiner*—Fred Teskin
*Attorney, Agent, or Firm*—Oblon, Spivak, McClelland, Maier & Neustadt

[57] ABSTRACT

There are disclosed a catalyst for producing an aromatic vinyl compound polymer which catalyst comprises a contact product between an (A) trivalent titanium compound and a (B) compound represented by the general formula (II) or (III)

$$R^1{}_k M^1 L^2{}_m \qquad (II)$$

$$R^1{}_k M^1 X^2{}_j L^2{}_m \qquad (III)$$

a (C) an ionic compound comprising a noncoordinate anion and a cation, an aluminoxane or an organoboron compound; and optionally a (D) Lewis acid, and a process for producing an aromatic vinyl compound polymer having a high degree of syndiotactic configuration which process comprises polymerizing (a) an aromatic vinyl compound or (b) an aromatic vinyl compound together with an olefin or a diolefin in the presence of the above catalyst.

By virtue of using the trivalent titanium compound, it is made possible to readily prepare the above catalyst in high yield, to efficiently produce the above (co)polymer in high catalytic activity by using the catalyst and further to enhance the syndiotacticity of the objective (co)polymer, while minimizing the by-production of unfavorable atactic (co)polymer.

8 Claims, 1 Drawing Sheet

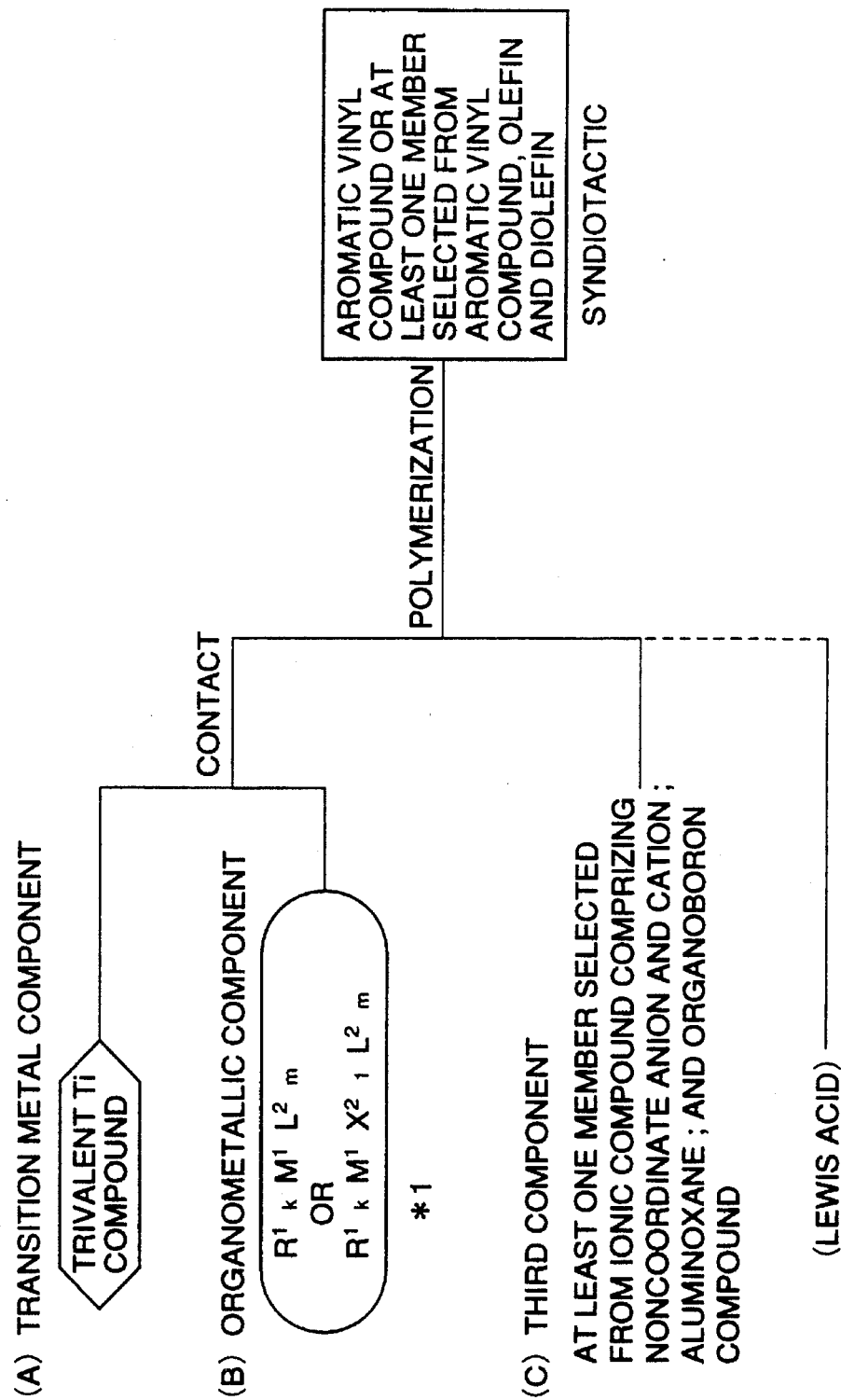

CATALYST FOR PRODUCING AROMATIC VINYL COMPOUND POLYMER AND PROCESS FOR PRODUCING AROMATIC VINYL COMPOUND POLYMER BY USING SAME

BACKGROUND OF THE INVENTION

1. Field of the Invention

The present invention relates to a novel catalyst for producing an aromatic vinyl compound polymer and a process for producing an aromatic vinyl compound polymer by using the same. More particularly, it pertains to a novel catalyst which comprises a trivalent titanium compound and is capable of efficiently producing a polymer or a copolymer of an aromatic vinyl compound having a high degree of syndiotactic configuration in its aromatic vinyl chain of the polymer or copolymer (hereinafter sometimes referred to generically as "(co)polymer") and a process for producing a polymer or a copolymer of an aromatic vinyl compound by the use of said catalyst.

2. Description of the Related Arts

Heretofore, styrenic polymers produced by the radical polymerization method or the like have an atactic configuration in stereostructure and are molded to various shapes by various molding methods such as injection molding, extrusion molding, blow molding, vacuum molding and cast molding, and they have been widely used as domestic electrical appliances, office machines, household goods, packaging containers, toys, furnitures, synthetic papers, sheets, films and other industrial materials.

However, such styrenic polymers having atactic configuration have disadvantage that it is inferior in heat resistance and chemical resistance.

The group to which the present inventor belongs has previously succeeded in developing styrenic polymers having a high degree of syndiotacticity (see Japanese Patent Application Laid-Open Nos. 187708/1987, 179906/1988, 241009/1988, 249504/1992 etc.).

Since the styrene polymers having a syndiotactic configuration have melting points which are different from those of the conventional atactic polystyrenes, and are higher than those of the isotactic polystyrenes known so far, they are expected to be used as heat-resistant resins in various field.

However, in order to obtain a high performance catalyst capable of efficiently producing a styrenic polymer having a syndiotactic configuration, it has heretofore been necessary to prepare the catalyst by the use of a tetravalent titanium complex, thus complicating the preparation procedures including synthesis and purification and generally lowering the synthetic efficiency. On the other hand, the use of a catalyst prepared by using a trivalent titanium compound results in a decrease in the catalytic activity and in the formation of a styrenic polymer having a low degree of syndiotacticity and/or mixture of a styrenic polymer having a syndiotactic configuration and a styrenic polymer having an atactic configuration (refer to Japanese Patent Application Laid-Open No. 120706/1988). In general, the use of a tetravalent titanium complex brings about lowering of the melting point of the resultant polymer, that is, the loss of the characteristics of a styrenic polymer having a syndiotactic configuration, while the use of a trivalent titanium compound unfavorably necessitates a further purification step, that is, the removal of a styrenic polymer having an atactic configuration.

As mentioned hereinbefore, the valency of titanium in the titanium compound to be used for the preparation of a catalyst has a pronounced effect on the stereoregularity of the polymer to be produced. It is known that in the production of an isotactic polypropylene, as opposed to the production of a styrenic polymer having a syndiotactic configuration, the use of a tetravalent titanium complex leads to the production of a polymer having a low stereoregularity only and the catalyst system having a high activity and causing a high regularity of the polymer is of a trivalent titanium compound system.

Under such circumstances, intensive research and investigation were continued by the present inventor in order to develop a process capable of efficiently producing a (co)polymer of an aromatic vinyl compound having a high degree of syndiotactic configuration by the use of a catalyst system which is prepared by using a trivalent titanium compound.

As a result, it has been found by the present inventor that a (co)polymer of an aromatic vinyl compound having a high degree of syndiotactic configuration and a low degree of atactic configuration can efficiently be produced in high activity by the use of a catalyst which comprises (1) a catalyst component obtained by contact-mixing, in advance, a trivalent titanium compound and a definite compound, (2) at least one catalyst component selected from the group consisting of an ionic compound comprising a noncoordinate anion and a cation, an aluminoxane and an organoboron compound and optionally (3) a Lewis acid. The present invention has been accomplished by the aforesaid finding and information.

SUMMARY OF THE INVENTION

Specifically, the present invention provides as the first aspect thereof, a catalyst for producing an aromatic vinyl compound polymer which catalyst comprises a contact product between an (A) trivalent titanium compound and a (B) compound represented by the general formula (II) or (III)

$$R^1_k M^1 L^2_m \qquad \text{(II)}$$

$$R^1_k M^1 X^2_l L^2_m \qquad \text{(III)}$$

wherein $R^1$ is a π ligand, $M^1$ is a typical metal belonging to any of the groups 1 to 3 of the Periodic Table, $X^2$ is a σ ligand, $L^2$ is a Lewis base, when being plural a plurality of $R^1$ may be the same or different, when being plural a plurality of $L^2$ may be the same or different, k is an integer of one (1) or greater, l is an integer of zero (0) or greater, m is an integer from zero (0) to 4 and k+l stands for the valency of $M^1$; and a (C) at least one member selected from the group consisting of an ionic compound comprising a noncoordinate anion and a cation, an aluminoxane and an organoboron compound.

The present invention further provide as the second aspect thereof, a catalyst for producing an aromatic vinyl compound polymer which catalyst comprises a contact product between an (A) trivalent titanium compound and a (B) compound represented by the general formula (II) or (III)

$$R^1_k M^1 L^2_m \qquad \text{(II)}$$

$$R^1_k M^1 X^2_l L^2_m \qquad \text{(III)}$$

wherein $R^1$ is a π ligand, $M^1$ is a typical metal belonging to any of the groups 1 to 3 of the Periodic Table, $X^2$ is a σ ligand, $L^2$ is a Lewis base, when being plural a plurality of $R^1$ may be the same or different, when being plural a plurality of $L^2$ may be the same or different, k is an integer of one (1) or greater, l is an integer of zero (0) or greater, m is an integer from zero (0) to 4 and k+1 stands for the valency of $M^1$; a (C) at least one member selected from the group consisting of an ionic compound comprising a noncoordinate anion and a cation, an aluminoxane and an organoboron compound; and a (D) Lewis acid.

The present invention still further provides as the third aspect thereof, a process for producing an aromatic vinyl compound polymer having a high degree of syndiotactic configuration in its aromatic vinyl chain of the polymer which process comprises polymerizing (a) an aromatic vinyl compound or (b) an aromatic vinyl compound together with at least one compound selected from the group consisting of an olefin and a diolefin in the presence of the catalyst as described hereinbefore.

BRIEF DESCRIPTION OF DRAWING

FIG. 1 is a schematic illustration showing a block flow diagram for carrying out the process of the present invention according to Ziegler catalyst. In the formula *1, $R^1$ is a π ligand, $M^1$ is a typical metal belonging to any of the groups 1 to 3 of the Periodic Table, $X^2$ is a σ ligand, $L^2$ is a Lewis base, when being plural a plurality of $R^1$ may be the same or different, when being plural a plurality of $L^2$ may be the same or different, k is an integer of one (1) or greater, l is an integer of zero (0) or greater, m is an integer from zero (0) to 4 and k+1 stands for the valency of $M^1$.

DESCRIPTION OF THE PREFERRED EMBODIMENT

There will be described in the following, each of the components of the catalyst (A) to (D) for the production of the aromatic vinyl compound polymer according to the present invention.

As a trivalent titanium compound which constitutes the component (A), various trivalent titanium compounds can be used without specific limitation and exemplified by the compounds represented by the general formula (I)

$$TiX^1_3 L^1_n \qquad (I)$$

wherein $X^1$ is a σ ligand, $L^1$ is a Lewis base, a plurality of $X^1$ may be the same or different and may be bonded to each other via an arbitrary group, a plurality of $L^1$ may be the same or different, n is an integer of zero (o) or greater, and when n is zero, the trivalent titanium compound does not have a Lewis base.

Specific examples of $X^1$ include hydrogen atom, a hydrocarbon group having 1 to 20 carbon atoms, an aromatic hydrocarbon group having 6 to 20 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, amino group, amide group, carboxyl group, an alkylsilyl group and a halogen atom.

Specific examples of $L^1$ include ethers, amines, nitriles, phosphines, isonitriles, alcohols, ketones and esters.

Of the compounds represented by the general formula (I), trichlorotitanium-tristetrahydrofuran: [$TiCl_3(THF)_3$] is preferable.

The component (B) is a compound represented by the general formula (II) or (III)

$$R^1_k M^1 L^2_m \qquad (II)$$

$$R^1_k M^1 X^2_l L^2_m \qquad (III)$$

wherein $R^1$ is a π ligand, $M^1$ is a typical metal belonging to any of the groups 1 to 3 of the Periodic Table, $X^2$ is a σ ligand, $L^2$ is a Lewis base, when being plural a plurality of $R^1$ may be the same or different, when being plural a plurality of $L^2$ may be the same or different, k is an integer of one (1) or greater, l is an integer of zero (0) or greater, m is an integer from zero (0) to 4 and k+1 stands for the valency of $M^1$.

Specific examples of $R^1$ include a cyclopentadienyl group, a substituted cyclopentadienyl group, an indenyl group, a substituted indenyl group and a fluorenyl group, among which are preferable cyclopentadienyl group and a substituted cyclopentadienyl group.

Specific examples of $M^1$ include lithium, sodium, potassium, magnesium and calcium.

Specific examples of $X^2$ are same as those of $X^1$, that is, include hydrogen atom, a hydrocarbon group having 1 to 20 carbon atoms, an aromatic hydrocarbon group having 6 to 20 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, amino group, amide group, carboxyl group, an alkylsilyl group and a halogen atom.

Specific examples of $L^2$ are same as those of $L^1$, that is, include ethers, amines, nitriles, phosphines, isonitriles, alcohols, ketones and esters.

The compound represented by the general formula (II) or (III), even in the case where it has not a σ ligand or Lewis base when l or m is zero (o), can be used as the component (B).

More specific examples of $R^1$ include a cyclopentadienyl group; methylcyclopentadienyl group; 1,2-dimethylcyclopentadienyl group; 1,3-dimethylcyclopentadienyl group; 1,3-di(tert-butyl)cyclopentadienyl group; 1,3-di(trimethylsilyl)cyclopentadienyl group; 1,2,3-trimethylcyclopentadienyl group; 1,2,4-trimethylcyclopentadienyl group; 1,2,3,4-tetramethylcyclopentadienyl group; pentamethylcyclopentadienyl group; 1-ethyl-2,3,4,5-tetramethylcyclopentadienyl group; 1-benzyl-2,3,4,5-tetramethylcyclopentadienyl group; 1-phenyl-2,3,4,5-tetramethylcyclopentadienyl group; 1-trimethylsilyl-2,3,4,5-tetramethylcyclopentadienyl group; 1-trimethylsilyl-2,3,4,5-tetramethylcyclopentadienyl group; 1-trifluoromethyl-2,3,4,5-tetramethylcyclopentadienyl group; indenyl group; tetrahydroindenyl group; 1,2,3-trimethyltetrahydroindenyl group; 1,2,3-trimethylindenyl group; heptamethylindenyl group; and 1,2,4,5,6,7-hexamethylindenyl group, of which pentamethylcyclopentadienyl group is particularly preferable.

More specific examples of $X^2$ include a hydrogen atom, methyl group, benzyl group, phenyl group, trymethylsilylmethyl group, methoxy group, ethoxy group, phenoxy group, thiomethoxy group, trimethylamino group, dimethylamino group, diisopropylamino group, chlorine atom, bromine atom and iodine atom.

As the component (C), there is usable at least one compound selected from the group consisting of an ionic compound comprising a noncoordinate anion and a cation, an aluminoxane and an organoboron compound. A plurality of such compounds as the component (C) may arbitrarily be combined.

Examples of the ionic compound comprising a noncoordinate anion and a cation include a compound represented by the general formula (IV) or (V)

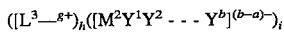   (IV)

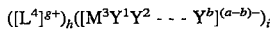   (V)

wherein $L^4$ is $M^4$, $R^2R^3M^5$ or $R^4{}_3C$ as hereinafter described; $L^3$ is a lewis base; $M^2$ and $M^3$ are each an element selected from Groups 5 to 15 of the Periodic Table and exemplified by B, Al, P, AS and Sb; $M^4$ is an element selected from Groups 8 to 12 of the Periodic Table and exemplified by Ag and Cu; $M^5$ is an element selected from Groups 8 to 10 of the Periodic Table and exemplified by Fe, Co and Ni; $Y^1$ to $Y^b$ are each a hydrogen atom, dialkylamino group, alkoxy group, aryloxy group, alkyl group having 1 to 20 carbon atoms, aryl group having 6 to 20 carbon atoms, arylalkyl group, alkylaryl group, substituted alkyl group, or ganometalloid group or halogen atom and exemplified by dimethylamino group, diethylamino group, methoxy group, ethoxy group, butoxy group, phenoxy group, 2,6-dimethylphenoxy group, methyl group, ethyl group, propyl group, butyl group, octyl group, phenyl group, tolyl group, xylyl group, mesityl group, benzyl group, pentafuluorophenyl group, 3,5-di(trifluoromethyl)group, 4-tert-butylphenyl group, F, Cl, Br and I; $R^2$ and $R^3$ are each a cyclopentadienyl group, substituted cyclopentadienyl group, indenyl group, substituted indenyl group or fluorenyl group and exemplified by methylcyclopentadienyl group and pentamethylcyclopentadienyl group; $R^4$ is an alkyl group, aryl group or a substituted aril group, may be the same or different and exemplified by a phenyl group, 4-methoxyphenyl group and 4-methylphenyl group; a is the valency of each of $M^2$ and $M^3$, indicating an integer from 1 to 7; b is an integer from 2 to 8; g is the ion valency of each of $[L^3—H]$ and$[L^4]$, indicating an integer from 1 to 7; h is an integer of 1 or greater and $i=(h\times g)/(b-a)$.

Examples of the noncoordinate anion in the aforestated ionic compound include (tetraphenyl)borate; tetra(fluorophenyl)borate; tetrakis(difluorophenyl)borate; tetrakis(trifluorophenyl)borate; tetrakis(tetrafluorophenyl)borate; tetrakis(pentafluorophenyl)borate; tetrakis(trifluoromethylphenyl)borate; tetra(tolyl)borate; tetra(xylyl)borate; (triphenylpentafluorophenyl)borate; [tris(pentafluorophenyl)phenyl]borate and tridecahydride-7, 8-dicarbaundecaborate.

Examples of the cation in the above-mentioned ionic compound include triethyl ammonium; tributyl ammonium; N,N'-dimethylanilinium; N,N'-diethylanilinium; triphenylphosphinium; dimethylphenylphosphinium; 1,1'-dimethylferrocene; decamethylferrocene; silver (I); triphenylcarbenium; tritolylcarbenium; trimethoxyphenylcarbenium; (ditolylphenyl)carbenium; [di(methoxyphenyl)phenyl]carbenium and [methoxyphenyl di(phenyl)]carbenium.

The above-mentioned ionic compound can preferably be used by optionally selecting the noncoordinate anion and cation from amound the above-exemplified examples and combining the selected ones. A preferable ionic compound is 1,1'-dimethylferrocenium tetra(pentafluorophenyl)borate.

An aluminoxane is a compound obtained by bringing an organoaluminum compound into contact with a condensing agent.

Examples of such aluminoxane include chain alkylaluminoxane represented by the general formula (VI)

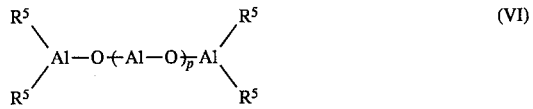   (VI)

wherein $R^5$ is an alkyl group having 1 to 20 carbon atoms and may be the same or different; and P is an integer of 0 to 50, preferably 5 to 30, and cycloalkylaluminoxane having the repeating unit represented by the general formula (VII)

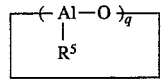   (VII)

wherein $R^5$ is as previously defined; and q is an integer of 2 to 5, preferably 5 to 30.

Examples of the organoaluminum compound to be used as a starting material for the aluminoxane include a trialkylaluminum such as trimethylaluminum, triethylaluminum, triisobutylaluminum and a mixture thereof. Examples of the condensing agent is water as a typical one and optionally a material capable of undergoing a condensation reaction with the trialkylaluminum which material is exemplified by adsorption water in an inorganic matter and diol.

Examples of the organoboron compounds usable as the component (C) include the compound represented by the general formula (VIII)

$$R^6{}_3BL^5{}_j$$   (VIII)

wherein $R^6$ is a hydrocarbon group having 1 to 20 atoms, an aromatic hydrocarbon group having 6 to 20 carbon atoms, a substituted aromatic hydrocarbon group, hydrogen atom or a halogen atom, may be the same or different and specifically exemplified by a phenyl group, tolyl group, fluorophenyl group, trifluoromethylphenyl group, pentafluorophenyl group, fluorine atom, chlorine atom, bromine atom and iodine atom; $L^5$ is a Lewis base and exemplified by an ether compound such as diethyl ether and tetrahydrofuran and an amine compound such as pyridine; and j is an integer from zero (0) to 3.

In the catalyst according to the present invention, a Lewis acid may be used as the component (D) according to the desire and is exemplified by an organoaluminum compound, a magnesium compound, a zinc compound and a lithium compound. In addition, an aluminoxane and an organoboron compound among the component (C) pertain to a Lewis acid. The aluminoxane as the component (C) preferably has a p value of 2 to 30 in the general formula (VI) and also a q value of 2 to 30 in the general formula (VII).

Specific examples of the above-mentioned organoaluminum compound include the compound represented by the general formula (IX)

$$R^7{}_rAl(OR^8)_sH_tZ_u$$   (IX)

wherein $$R^7{}_rAl(OR^8)_sH_tZ_u$$   (IX)

alkyl group having 1 to 8 carbon atoms and may be the same or different; Z is an halogen atom; r,s,t and u each satisfy the relations $0<r\leq 3$, $0<s\leq t<3$, and $0\leq u<3$ and $r+s+t+u=3$.

In the organoaluminum compound represented by the general formula (IX), the compound wherein $t=u=0$ and $r=3$ is exemplified by trimethylaluminum, triethylaluminum, triisopropylaluminum, triisobutylaluminum and trioctylaluminum. In the case of $t=u=0$ and $1.5\leq r<3$, included are diethylaluminum ethoxide, dibutylaluminum butoxide, diethylaluminum sesquiethoxide and dibutylaluminum sesquibutoxide; as well as partially alkoxylated alkylaluminum.

Examples of the compound corresponding to the case where $s=t=0$ include diethylaluminum dichloride and dibutylaluminum dichloride ($r=2$); ethylaluminum sesquichloride and butylaluminum sesquichloride ($r=1.5$); and ethylaluminum dichloride and butylaluminum dichloride ($r=1$).

Examples of the compound corresponding to the case in which $s=u=0$ include diethylaluminum hydride and diisobutylaluminum hydride (r=2); and ethylaluminum dihydride and butylaluminum dihydride (r=1).

Examples of the above-mentioned magnesium compound include a Grignard compound such as methylmagnesium bromide, ethylmagnesium bromide, phenylmagnesium bromide and benzylmagnesium bromide, an organomagnesium compound such as diethoxymagnesium and ethylbutylmagnesium and an inorganic magnesium compound such as magnesium chloride, among which is preferable the Grignard compound. In addition, mention may be made of a zinc compound exemplified by an organozinc compound such as diethylzinc and of a lithium compound exemplified by an organolithium compound such as methyllithium.

In the catalyst according to the present invention, the aforestated Lewis acid as the component (D) may be used alone or in combination with at least one other one.

Moreover, a desirable catalyst component other than the component (D) may be incorporated in the catalyst components according to the present invention.

The following is illustrative of the method for preparing the catalyst according to the present invention. The present catalyst is prepared by a method wherein the components (A) and (B) are contact-mixed with each other to form a contact product, which is purified as necessary and then contact-mixed with the component (C), an according to the desire, further with the component (D) and/or desirable components.

The blending ratio of the component (A) to the component (B) varies depending upon various conditions and thus can not determined unequivocally but is usually 1:0.1 to 1:5, preferably 1:0.1 to 1:2 in terms of molar ratio of titanium in the component (A) to $R^1$ ($\pi$ ligand) in the component (B) (Ti:$R^1$).

The contact temperature is usually −100° to 200° C. At the time of contact mixing, a solvent is not necessarily required but is preferably used in order to effectively carry out the contact mixing. Examples of usable solvents include an aliphatic hydrocarbon-based solvent such as pentane, hexane and heptane, an alicyclic hydrocarbon-based solvent such as cyclohexane, an aromatic hydrocarbon-based solvent such as benzene, toluene, xylene and ethylbenzene, an ether-based solvent such as tetrahydrofuran and diethyl ether, a halogen-based solvent such as methylene chloride and chloroform and an amine-based solvent such as pyridine, triethylamine and dimethylaniline. The contact product between the components (A) and (B) can be purified by means of solvent cleaning, reprecipitation, recrystallization or the like.

As a method for contact-mixing the contact product between the components (A) and (B) with the component (C) and a desirable component typified by the component (D), mention may be made of ① a method in which the contact product between the components (A) and (B) is contact mixed with the component (C), then the component (D) is added to the resultant mixture with contact mixing to form a catalyst, which is brought into contact with a monomer component to be polymerized ② a method in which the contact product between the components (A) and (B) is added to the contact product between the components (C) and (D) with contact mixing to form a catalyst, which is brought into contact with a monomer component to be polymerized; ③ a method in which the contact product between the components (A) and (B) is contact mixed with the component (D), then the component (C) is added to the resultant mixture with contact mixing to form a catalyst, which is brought into contact with a monomer component to be polymerized; ④ a method in which the contact product between the components (A) and (B) and the contact product between the component (C) and the component (D) are each separately brought into contact with a monomer component to be polymerized; and ⑤ method in which the component (D) is added with contact mixing to the monomer component to be polymerized and then the resultant mixture is contact mixed with the contact product obtained by any one of the abovementioned methods ① to ④.

It follows that in the methods ⑤, the component (D) is twice contact mixed.

The blending ratio of the component (C) varies depending upon various conditions and thus can not unequivocally be determined. However, when the component (C) is aluminoxane, the molar ratio of titanium Ti contained in the contact product between the components (A) and (B) to aluminoxane as the component (C) is selected so as to be 1:1 to 1:10.000, preferably 1:1 to 1:1.000. In the case where the component (C) is an ionic compound comprising a noncoordinate anion and a cation, or an organoboron compound, the molar ratio of titanium Ti contained in the contact product between the components (A) and (B) to the ionic compound or the organoboron compound is selected so as to be 1:0.1 to 1:10, preferably 1:1 to 1:10.

The blending ratio of the component (D) varies depending upon various conditions and hence can not unequivocally be determined, but is usually selected in the range of 1:0.1 to 1:1.000 in terms of titanium Ti contained in the contact product between the components (A) and (B) to the component (D).

The contact mixing of the component (C) and the desirable component typified by the component (D) is carried out usually in the range of −20° to 200° C., and needless to say at the polymerization temperature or lower. In the case where the components (C) and (D) are contact mixed with each other, there may be used when necessary, a solvent same as the solvent as exemplified in the case of contact mixing of the components (A) and (B).

The following is illustrative of a process for producing the aromatic vinyl compound (co)polymer by using the catalyst according to the present invention and of the aromatic vinyl compound (co)polymer produced by the above-mentioned process.

The present invention enables the production of an aromatic vinyl compound polymer having a high degree of syndiotactic configuration in its aromatic vinyl chain of the polymer by (co)polymerizing (a) at least one aromatic vinyl compound or by (co)polymerizing (a) an aromatic vinyl compound and (b) at least one compound selected from the group consisting of an olefin and a diolefin each in the presence of the catalyst as prepared in accordance with the foregoing description. The process of the present invention includes not only the process for polymerizing only one kind of monomer but also the process for copolymerizing a plurality of monomers.

Examples of the (a) aromatic vinyl compound as the monomer component include styrene, alkylstyrenes such as p-methylstyrene; m-methylstyrene; o-methylstyrene; 2,4-dimethylstyrene; 2,5-dimethylstyrene; 3,4-dimethylstyrene; 3,5-dimethylstyrene; and p-tertiary-butylstyrene; alkoxystyrenes such as p-methoxystyrene; m-methoxystyrene; o-methoxystyrene; 2,4-dimethoxystyrene; 2,5-dimethoxystyrene; 3,4-dimethoxystyrene; 3,5-dimethoxystyrene; and p-tert-butoxystyrene, halogenated styrenes such as p-chlorostyrene; m-chlorostyrene; o-chlorostyrene; p-bromostyrene; m-bromostyrene; o-bromostyrene; p-fluorostyrene; m-fluorostyrene; o-fluorostyrene and o-methyl-p-fluorostyrene; organosiliconated styrenes, vinylbenzoic acid esters and divinylbenzene. The aromatic vinyl compound may be used alone or in combination with at least one other one.

Examples of the (b) olefin as the monomer component include α-olefins such as ethylene; propylene; butene-1; pentene-1; hexene-1; heptene-1; octene-1; nonene-1; decene-1; 4-phenylbutene-1; 6-phenylhexene-1; 3-methylbutene-1; 4-methylpentene-1; 3-methylpentene-1; 3-methylhexene-1; 4-methylhexene-1; 5-methylhexene-1; 3,3-dimethylpentene-1; 3,4-dimethylpentene-1; 4,4-dimethylpentene-1; vinylcyclohexane and vinylcyclohexene, halogen-substituted α-olefins such as hexafluoropropene; tetrafluoroethylene; 2-fluoropropene; fluoroethylene; 1,1-difluoroethylene; 3-fluoropropene; trifluoroethylene; and 3,4-dichlorobutene-1, cyclic olefins such as cyclopentene; cyclohexene; norbornene; 5methylnorbornene; 5-ethylnorbornene; 5-propylnorbornene; 5,6-dimethylnorbornene; 1-methylnorbornene; 7-methylnorbornene; 5,5,6-trimethylnorbornene; 5-phenylnorbornene; 5-benzylnorbonene; and 5-vinylnorbornene.

Examples of diolefin also as the monomer component include straight chain diolefins such as butadiene; isoprene; and 1,6-hexadiene, and cyclic diolefins such as norbornadiene; 5-ethylidenenorbornene; 5-vinylnorbornene; and dicyclopentadiene.

The monomer component (b) may be used alone or in combination with at least one other one.

The polymerization method may be bulk polymerization method without specific limitation. The polymerization may be carried out in an aliphatic hydrocarbon solvent such as pentane, hexane and heptane, an alicyclic hydrocarbon solvent such as cyclohexane or an aromatic hydrocarbon solvent such as benzene, toluene, xylene and ethylbenzene.

The polymerization temperature is usually 0° to 200° C., preferably 20° to 100° C. In the case where a gaseous monomer is employed, the partial pressure of the gaseous monomer is usually 100 kg/cm$^2$ (9.80665×10$^6$ Pa) or lower, preferably 30 kg/cm$^2$ (2.94199×10$^6$ Pa) or lower.

The modification of the molecular weight of the aromatic vinyl compound (co)polymer to be obtained can effectively be made by effecting the polymerization reaction in the presence of hydrogen.

A high degree of syndiotactic configuration in the aromatic vinyl chain of the aromatic vinyl (co)polymer obtained by the process in accordance with the present invention signifies that its stereochemical structure is of high degree of syndiotactic configuration, i,e., the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the ($^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of syndiotactic configuration" as mentioned in the present invention usually means polystyrene, poly(substituted styrene), poly(vinyl benzoate), the mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(substituted styrene) includes poly(hydrocarbon group-substituted styrene) such as poly(methylstyrene), poly(ethylstyrene), poly(isopropylstyrene), poly(phenylstyrene) and poly(vinylstyrene); poly(halogenated styrene) such as poly(chlorostyrene), poly(bromostyrene), and poly(fluorostyrene); and poly(alkoxystyrene) such as poly(methoxystyrene) and poly(ethoxystyrene).

It is also possible in the present invention to produce an olefinic (co)polymer by (co)polymerizing at least one olefin in the presence of the catalyst as the first or second aspect of the present invention.

By virtue of using the trivalent titanium compound instead of a tetrabvalent titanium compound as an indispensable component of the polymerization catalyst, it is made possible to readily produce the catalyst for producing an aromatic vinyl compound (co)polymer having a high degree of syndiotactic configuration in high yield, to efficiently produce such a (co)polymer in high catalytic activity as compared with the conventional catalyst of trivalent titanium compound and further to enhance the syndioatacticity of the resultant (co)polymer while minimizing the by-production of atactic (co)polymer.

Accordingly, the catalyst and process for producing the aromatic vinyl compound (co)polymer having a high degree of syndiotactic configuration is particularly preferably employed in the field of producing such syndiotactic (co)polymer.

In the following, the present invention will be described in more detail with reference to working examples, which however shall not be construed to limit the present invention thereto.

Preparation Example 1

18.2 g (49 mmol) of trichlorotitanium/tristetrahydrofuran [TiCl$_3$(THF)$_3$] and 8.7 g (45 mmol) of pentamethylcyclopentadienyllithium [Cp*Li] were mixed in a solid state and 200 ml of tetrahydrofuran was added to the mixture to start stirring. Subsequently, the reaction system temperature was set on 50° C. udner stirring for 12 hours. As a result, the mixture in the form of solid was totally dissolved to form a blue solution, which was brought to room temperature and subjected to vacuum distillation to distil away the solvent to form a brown solid. It was filtered to remove the ether and toluene-insoluble and the solution was dried to form a blackish brown solid, which was subjected to repeated washing with hexane to recover 15.1 g of hexane insoluble portion having a Ti content of 12% by weight.

Preparation Example 2

0.68 g (equivalent to 1.7 mmol Ti) of the contact product which had been produced in Preparation Example 1 was dissolved in 40 ml of tetrahydrofuran to form yellowish green solution, which was incorporated under ice cooling with 1.0 ml of 3 mol/liter solution of methylmagnesium bromide (MeMgBr) in diethyl ether with stirring for 30 minutes. It turned out to be brown solution, which was subjected to vacuum distillation to distil away volatile matters to form a reddish brown solid. It was subjected to extraction-cleaning with hexane, the isoluble was removed by filtration and the solution was dried. As a result, 0.41 g of a dark reddish brown solid having a Ti content of 13% by weight was obtained.

Preparation Example 3

32 mg (equivalent to 80 μmol Ti) of the contact product which had been produced in Preparation Example 1 was dissolved in 20 ml of toluene to form reddish brown solution. 70 mg of 1,1'-dimethylferrocenium tetra(pentafluorophenyl)borate was suspended in 20 ml of toluene at room temperature and the resultant suspension was incorporated with the above-obtained solution. As a result, the suspension rapidly turned out to be reddish violet solution, while stirring was continued as such for one day and night. The solution was subjected to vacuum distillation away the toluene to form a reddish violet solid, which was washed with hexane to recover 56 mg of reddish violet hexane-insoluble matter having a Ti content of 4.5% by weight.

EXAMPLE 1

In a 30 ml glass ampule were placed 10 ml of purified dried styrene, 50 µl of 2 mol/liter solution of triisobutylaluminum in toluene and 100 µl of 1 mol/liter solution of methylaluminoxane in toluene with heating on an oil bath at 70° C. Then, to the resultant mixture was added the contact product as obtained in preparation Example 1 in an amount of $2.0 \times 10^{-4}$ g corresponding to 0.5 µmol of titanium to proceed with polymerization for 4 hours. The polymer thus obtained was washed with methanol and dried to recover 6.614 g of the polymer, which was subjected to Soxhlet extraction under boiling for 5 hours by the use of methyl ethyl ketone (a solvent in which atactic polystyrene is soluble but syndiotactic polystyrene is insoluble). Thus, 6.416 g of insoluble was recovered as the objective polymer. It had at least 90% sydiotacticity in terms of racemic pentad as a result of $^{13}$C-NMR analysis, thereby proving to be syndiotactic polystyrene having extremely high stereoregularity. The catalytic activity in the polymerization was equivalent to 268 kg/g-Ti.

EXAMPLE 2

In a 30 ml glass ampule were placed 10 ml of purified dried styrene and 100 µl of 1 mol/liter solution of methylaluminoxane in toluene with heating on an oil bath at 70° C. Then, to the resultant mixture was added the contact product as obtained in Preparation Example 1 in an amount of $4.0 \times 10^{-4}$ g corresponding to 1.0 µmol of titanium to proceed with polymerization for 4 hours. The polymer thus obtained was washed with methanol and dried to recover 0.778 g of the polymer, which was subjected to Soxhlet extraction under boiling for 5 hours by the use of methyl ethyl ketone. Thus, 0.747 g of insoluble was recovered as the objective polymer. It had at least 90% sydiotacticity in terms of racemic pentad as a result of $^{13}$C-NMR analysis, thereby proving to be syndiotactic polystyrene having extremely high stereoregularity. The catalytic activity in the polymerization was equivalent to 16 kg/g-Ti.

EXAMPLE 3

In a 30 ml glass ampule were placed 10 ml of purified dried styrene, 50 µl of 2 mol/liter solution of triisobutylaluminum in toluene and 100 µl of 1 mol/liter solution of methylaluminoxane in toluene with heating on an oil bath at 70° C. Then, to the resultant mixture was added the contact product as obtained in Preparation Example 2 in an amount of $19 \times 10^{-4}$ g corresponding to to 0.5µ mol of titanium to proceed with polymerization for 4 hours. The polymer thus obtained was washed with methanol and dried to recover 3.830 g of the polymer, which was subjected to Soxhlet extraction under boliling for 5 hours by the use of methyl ethyl ketone. Thus, 3.677 g of insoluble was recovered as the objective polymer. It had at least 90% sydiotacticity in terms of racemic pentad as a result of $^{13}$C-NMR analysis, thereby proving to be syndiotactic polystyrene having extremely high stereoregularity. The catalytic activity in the polymerization was equivalent to 154 kg/g-Ti.

EXAMPLE 4

In a 30 ml glass ampule were placed 10 ml of purified dried styrene and 100 µl of 1 mol/liter solution of methylaluminoxane in toluene with heating on an oil bath at 70° C. Then, to the resultant mixture was added the contact product as obtained in Preparation Example 1 in an amount of $3.7 \times 10^{-4}$ g corresponding to 1.0 µmol of titanum to proceed with polymerization for 4 hours. The polymer thus obtained was washed with methanol and dried to recover 1.659 g of the polymer, which was subjected to Soxhlet extraction under boiling for 5 hours by the use of methyl ethyl ketone. Thus, 1.161 g of insoluble was recovered as the objective polymer. It had at least 90% sydiotacticity in terms of racemic pentad as a result of $^{13}$C-NMR analysis, thereby proving to be syndiotactic polystyrene having extremely high stereoregularity. The catalytic activity in the polymerization was equivalent to 24 kg/g-Ti.

EXAMPLE 5

In a 30 mo glass ampule were placed 10 ml of purified dried styrene, 50 µl of 2 mol/liter solution of triisobutylaluminum in toluene and 100 µl of 1 mol/liter solution of methylaluminoxane in toluene with heating on an oil bath at 70° C. Then, to the resultant mixture was added the contact product as obtained in Preparation Example 3 in an amount of $5.3 \times 10^{-4}$ g corresponding to 0.5 µmol of titanium to proceed with polymerization for 4 hours. The polymer thus obtained was washed with methanol and dried to recover 5.984 g of the polymer, which was subjected to Soxhlet extraction under boiling for 5 hours by the use of methyl ethyl ketone. Thus, 5.745 g of insoluble was recovered as the objective polymer. It had at least 90% sydiotacticity in terms of racemic pentad as a result of $^{13}$C-NMR analysis, thereby proving to be syndiotactic polystyrene having extremely high stereoregularity. The catalytic activity in the polymerization was equivalent to 240 kg/g-Ti.

EXAMPLE 6

In a 30 ml glass ampule were placed 10 ml of purified dried styrene and 100 µl of 1 mol/liter solution of methylaluminoxane in toluene with heating on an oil bath at 70° C. Then, to the resultant mixture was added the contact product as obtained in Preparation Example 3 in an amount of $1.06 \times 10^{-3}$ g corresponding to 1.0 mol of titanium to proceed with polymerization for 4 hours. The polymer thus obtained was washed with methanol and dried to recover 1.909 g of the polymer, which was subjected to Soxhlet extraction under boiling for 5 hours by the use of methyl ethyl ketone. Thus, 1.814 g of insoluble was recovered as the objective polymer. It had at least 90% sydiotacticity in terms of racemic pentad as a result of $^{13}$C-NMR analysis, thereby proving to be syndiotactic polystyrene having extremely high stereoregularity. The catalytic activity in the polymerization was equivalent to 38 kg/g-Ti.

EXAMPLE 7

In a 30 ml glass ampule were placed 10 ml of purified dried styrene and 5 µl of 2 mol/liter solutioun of triisobutylaluminum in toluene with heating on an oil bath at 70° C. Then, to the resultant mixture was added the contact product as obtained in Preparation Example 3 in an amount of 1.06×10⁻³ g corresponding to 1.0 μmol of titanium to proceed with polymerization for 4 hours. The polymer thus obtained was washed with methanol and dried to recover 0.198 g of the polymer, which was subjected to Soxhlet extraction under boiling for 5 hours by the use of methyl ethyl ketone. Thus, 0.185 g of insoluble was recovered as the objective polymer. It had at least 90% sydiotacticity in terms of racemic pentad as a result of $^{13}$C-NMR analysis, thereby proving to be syndiotactic polystyrene having extremely high stereoregularity. The catalytic activity in the polymerization was equivalent to 4 kg/g-Ti.

Compartive Example 1

The procedure in Example 1 was repeated to carry out polymerization except that the contact product [TiCl₃(THF)₃] between trichlorotitanium (TlCl₃) and tristetrahydrofuran (THF) was used in an amount of 1.8×10⁻⁴ g corresponding to 0.5 μmol of titanium in place of the contact product between TiCl₃(THF)₃ and Cp*Li in preparation Example 1. However, after washing with methanol followed by drying, it was impossible to recover the polymer.

What is claimed is:

1. A catalyst for producing an aromatic vinyl compound polymer which catalyst comprises a contact product between an (A) trivalent titanium compound and a (B) compound represented by the general formula (II) or (III)

$$R^1{}_k M^1 L^2{}_m \qquad (II)$$

$$R^1{}_k M^1 X^2{}_l L^2{}_m \qquad (III)$$

wherein $R^1$ is a π ligand, $M^1$ is a metal belonging to any of the groups 1 to 3 of the Periodic Table, $X^2$ is a σ ligand, $L^2$ is a Lewis base, when being plural a plurality of $R^1$ may be the same or different, when being plural a plurality of $L^2$ may be the same or different, k is an integer of one (1) or greater, l is an integer of zero (0) or greater, m is an integer from zero (0) to 4 and k+l stands for the valency of $M^1$; and a (C) at least one member selected from the group consisting of an ionic compound comprising a noncoordinate anion and a cation, an aluminoxane and an organoboron compound.

2. A catalyst for producing an aromatic vinyl compound polymer which catalyst comprises a contact product between an (A) trivalent titanium compound and a (B) compound represented by the general formula (II) or (III)

$$R^1{}_k M^2 L^2{}_m \qquad (II)$$

$$R^1{}_k M^1 X^2{}_l L^2{}_m \qquad (III)$$

wherein $R^1$ is a π ligand, $M^1$ is a metal belonging to any of the groupas 1 to 3 of the Periodic Table, $X^2$ is a σ ligand, $L^2$ is a Lewis base, when being plural a plurality of $R^1$ may be the same or different, when being plural a plurality of $L^2$ may be the same or different, k is an integer of one (1) or greater, l is an integer of zero (0) or greater, m is an integer from zero (0) to 4 and k+l stands for the valency of $M^1$; a (C) at least one member selected from the group consisting of an ionic compound comprising a noncoordinate anion and a cation, an aluminoxane and an organoboron compound; and a (D) Lewis acid.

3. The catalyst according to claim 1 wherein the trivalent titanium compound as the component (A) is a compound represented by the general formula (I)

$$TiX^1{}_3 L^1{}_n \qquad (I)$$

wherein $X^1$ is a σ ligand, a plurality of $X^1$ may be the same or different and may be bonded to each other via an arbitrary group, $L^1$ is a Lewis base, when being plural a plurality of $L^1$ may be the same or different and n is an integer of zero (0) or greater.

4. The catalyst according to claim 2 wherein the trivalent titanium compound as the component (A) is a compound represented by the general formula (I)

$$TiX^1{}_3 L^1{}_n \qquad (I)$$

wherein $X^1$ is a σ ligand, a plurality of $X^1$ may be the same or different and may be bonded to each other via an arbitrary group, $L^1$ is a Lewis base, when being plural a plurality of $L^1$ may be the same or different and n is an integer of zero (0) or greater.

5. A process for producing an aromatic vinyl compound polymer having a high degree of syndiotactic configuration in its aromatic vinyl chain of the polymer which process comprises polymerizing an aromatic vinyl compound in the presence of the catalyst as set forth in claim 1.

6. A process for producing an aromatic vinyl compound polymer having a high degree of syndiotactic configuration in its aromatic vinyl chain of the polymer which process comprises polymerizing an aromatic vinyl compound in the presence of the catalyst as set forth in claim 2.

7. A process for producing an aromatic vinyl compound polymer having a high degree of syndiotactic configuration in its aromatic vinyl chain of the polymer which process comprises polymerizing an aromatic vinyl compound and at least one compound selected from the group consisting of an olefin and a diolefin in the presence of the catalyst as set forth in claim 1.

8. A process for producing an aromatic vinyl compound polymer having a high degree of syndiotactic configuration in its aromatic vinyl chain of the polymer which process comprises polymerizing an aromatic vinyl compound and at least one compound selected from the group consisting of an olefin and a diolefin in the presence of the catalyst as set forth in claim 2.

* * * * *